P. OLSSON.
CULTIVATOR.
APPLICATION FILED MAY 9, 1906.
949,244.
Patented Feb. 15, 1910.
2 SHEETS—SHEET 1.
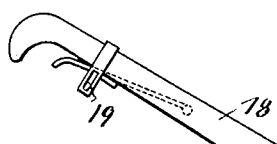
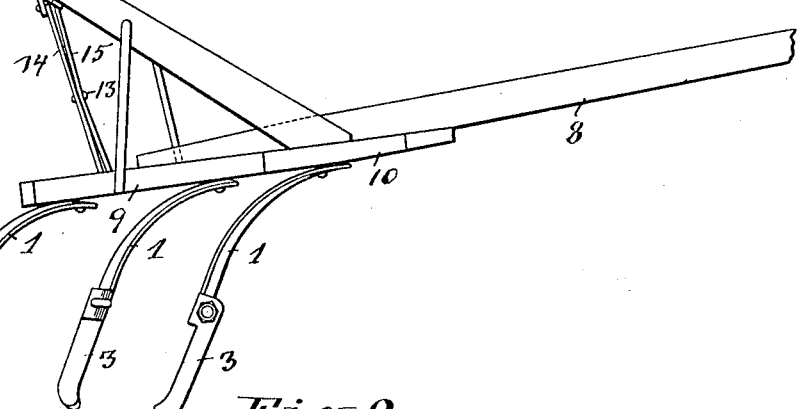
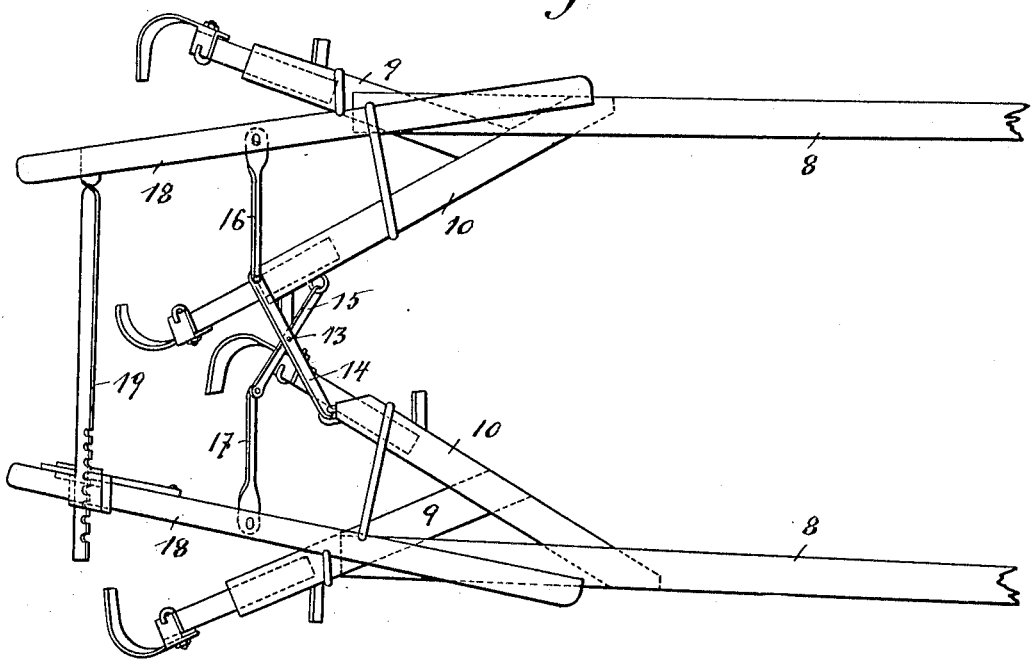
Witnesses:
Inventor
Per Olsson
By Henry Bennett
Attorney

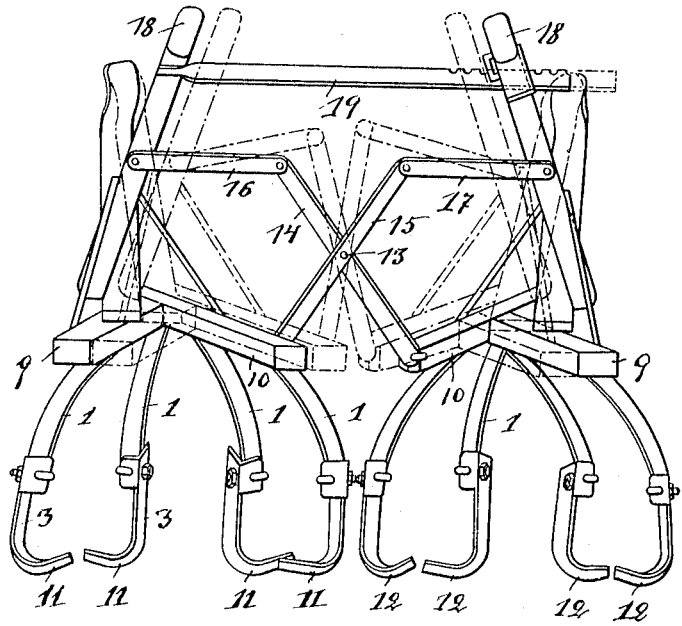
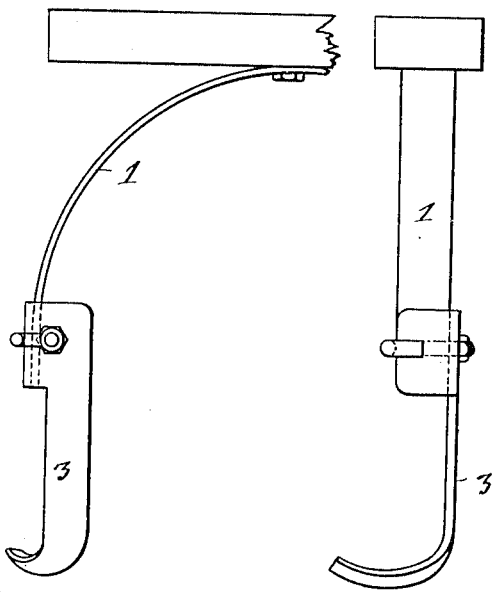

UNITED STATES PATENT OFFICE.

PER OLSSON, OF LIARUM, LINDERÖD, SWEDEN.

CULTIVATOR.

949,244.  Specification of Letters Patent.  Patented Feb. 15, 1910.

Application filed May 9, 1906. Serial No. 315,930.

*To all whom it may concern:*

Be it known that I, PER OLSSON, a subject of the King of Sweden, and resident of Liarum, Linderöd, in the Kingdom of Sweden, have invented certain new and useful Improvements in Cultivators, of which the following is a specification, reference being had therein to the accompanying drawings.

This invention relates to certain improvements in cultivators, and has for its object to provide a device of this character of a simple and comparatively inexpensive nature and of a compact, strong and durable construction having a novel and improved connection of the series or sets of shovels whereby said sets or series of shovels may be readily and conveniently adjusted toward and from each other for accommodating the cultivator for use where the plant rows are differently spaced without liability of throwing the shovels of either set out of their proper relative positions.

The invention consists in certain novel features of the construction, and combinations and arrangements of the several parts of the improved cultivator, whereby certain important advantages are attained and the device is rendered cheaper, simpler and otherwise better adapted and more convenient for use, all as will be hereinafter fully set forth.

The novel features of the invention will be carefully defined in the claims.

In the accompanying drawings which serve to illustrate my invention—Figure 1 is a side view of the improved cultivator; Fig. 2 is a plan view of the device; Fig. 3 is a rear elevation of the cultivator; Fig. 4 is an enlarged detail view showing one of the plows or shovels in side elevation, and Fig. 5 is a view similar to Fig. 4, but showing the plow or shovel in rear elevation.

As shown in these views, the improved cultivator comprises two similar side frames, each of which comprises bars 9 and 10, secured fixedly together at their forward ends and having their rear ends divergent from each other in a horizontal plane. The respective side frames thus formed have rigid connection at their forward ends with shafts 8, 8, which are spaced apart and adapted to be extended at opposite sides of the draft animal after the fashion of the thills or shafts of a vehicle.

The divergent bars 9 and 10 of the respective side frames of the cultivator carry standards 1, 1, extended down in curved directions below their undersides. These standards 1, 1, may be conveniently formed from spring material, and are made flattened to receive adjustable shovels or plows 3, 3, at their lower ends. The preferred form of the adjustable connection of said shovels or plows 3, 3, is shown clearly in Figs. 4 and 5, and comprises an angular ear or lateral extension produced upon the upper end of the shovel or plow and adapted to be fitted flush upon the flattened surface of the standard 1 and a hook-shaped bolt passed through the upper part of the plow or shovel and adapted to be extended along the side of the standard opposite to said lateral extension or ear. The hooked end of this bolt is arranged to engage over the edge of the standard opposite to that edge thereof which is flush upon the surface of the body portion of the plow or shovel, and said hooked end is also engaged over the free edge portion of said lateral extension or ear, while the straight end of the bolt, after being passed through the body portion of the plow or shovel is provided with a nut which, when tightened, serves to securely hold the shovel against movement lengthwise along the standard, but is adapted to be loosened at will to permit the shovel to be adjusted lengthwise upon the standard.

18, 18, represent handles, which are extended upward and rearwardly from the respective side frames of the cultivator, being connected at their lower forward ends with the shafts 8, 8, and being properly braced, and said handles are adapted to be held by the operator in a well known way for guiding the cultivator along the plant rows during use.

19 represents a tie bar extended across the space between the handles 18, 18, behind or in the rear of the shovels one end of said tie-bar being connected in any preferred way to one of the said handles, while its opposite end is arranged to play lengthwise through a loop suitably arranged upon the other handle 18 and is provided with a series of notches produced in one of its edges, which notches are adapted to be successively engaged by a spring detent carried by that handle 18 whereon is held the loop through which said notched end of the tie bar 19 is passed. By this arrangement, it will be evident that the detent may be lifted to disengage it from the notches of the tie bar 19, whereupon said tie bar may be slid lengthwise through the loop on the handle 18 whereon the detent is held, so that the handles may be adjusted to stand at any desired distance apart, whereupon the detent being released, is permitted to engage the notched tie bar to hold the same from longitudinal movement and thereby to retain the handles in adjusted position.

14 and 15 are links, each of which has pivotal connection at its forward end with one of the inner adjacent bars 10, 10, of the respective side frames of the cultivator, and these links 14 and 15 are crossed over one another and have a pivotal connection as shown at 13 at their intersection, and the free rear ends of the respective links 14 and 15 have connection by means of links 16 and 17, with the central portions of the respective handles 18, 18, of the improved cultivator.

By this construction it will be evident that the side frames of the improved cultivator are entirely separate and unconnected at their forward ends, and that the harness of the draft animal affords the only connection between said side frames during practical use of the cultivator, while during such use, the shafts 8, 8, whereon the side frames are rigidly secured are spaced apart from each other. When it is desired to adjust the side frames toward each other, this is accomplished by releasing the detent and sliding the notched tie bar 19 through the loop to the desired position, the link connection between the central parts of the handles and the rear ends of the frame bars 10, 10, serving to insure uniformity of movement of the side frames with the handles 18, 18.

In cultivators wherein the side frames are connected together at their forward ends, a comparatively small movement of such frames toward each other is sufficient to throw the forward shovels or plows laterally into the paths of the rearmost shovels, while a comparatively slight reverse adjustment of said side frames serves to separate the paths of the forward shovels too widely from those of the rearmost shovels, but where the side frames are unconnected with each other at their forward ends, and are provided with an adjustable connection extended between their rear ends behind the shovels carried by said side frames, as in the cultivator constructed according to my invention this disadvantage is avoided and the forward shovels are permitted to retain paths substantially uniformly spaced from those of the rearmost shovels despite a considerable degree of adjustment of the side frames toward or from each other.

The improved cultivator constructed according to my invention is of an extremely simple and comparatively inexpensive nature and is of a very strong and compact construction and is particularly well adapted for use by reason of the uniformity of spacing of the paths of the forward and rear shovels which is attained when the side frames are adjusted toward or from each other whereby the cultivator is adapted for use upon differently spaced plant rows without liability of the interference of the forward and rear shovels with each other.

Having thus described my invention, what I claim and desire to secure by Letters Patent is—

1. A cultivator having side frames provided with shovels, and unconnected at their forward parts and capable of movement toward and from each other, an adjustable connection extended between said side frames at the rear of the shovels and shafts having connection with the respective side frames.

2. A cultivator having side frames capable of movement toward or from each other and provided with shovels, shafts rigidly connected with the respective side frames and extended forwardly therefrom, said side frames being unconnected at their forward parts, and an adjustable connection extended between said side frames at the rear of the shovels.

3. A cultivator having side frames unconnected at their forward parts and capable of free movement toward and from each other and each comprising bars connected at their forward ends and with rear ends divergent in a horizontal plane, shovels carried by the bars of the respective side frames, shafts rigidly connected with the respective side frames and extended forwardly therefrom, and an adjustable connection extended between said side frames at the rear of the shovels carried thereby.

In witness whereof I have hereunto signed my name this 5 day of April 1906, in the presence of two subscribing witnesses.

PER OLSSON.

Witnesses:
CARL FRIBERG,
ROBERT APELGREN.